(12) United States Patent
Theiler et al.

(10) Patent No.: US 11,125,611 B2
(45) Date of Patent: Sep. 21, 2021

(54) METHOD FOR SENSING AMBIENT LIGHT IN A DISPLAY

(71) Applicant: ams AG, Premstaetten (AT)

(72) Inventors: Helmut Theiler, Eindhoven (NL); Josef Kriebernegg, Eindhoven (NL)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 16/961,877

(22) PCT Filed: Jan. 22, 2019

(86) PCT No.: PCT/EP2019/051488
§ 371 (c)(1),
(2) Date: Jul. 13, 2020

(87) PCT Pub. No.: WO2019/149575
PCT Pub. Date: Aug. 8, 2019

(65) Prior Publication Data
US 2020/0355550 A1    Nov. 12, 2020

(30) Foreign Application Priority Data
Jan. 30, 2018    (EP) .................................... 18154191

(51) Int. Cl.
*G09G 5/10* (2006.01)
*G01J 1/42* (2006.01)
*G01J 1/44* (2006.01)
*G01J 1/32* (2006.01)

(52) U.S. Cl.
CPC ............... *G01J 1/4204* (2013.01); *G01J 1/32* (2013.01); *G01J 1/44* (2013.01); *G09G 5/10* (2013.01); *G09G 2320/064* (2013.01); *G09G 2360/14* (2013.01); *G09G 2360/141* (2013.01); *G09G 2360/144* (2013.01); *G09G 2360/145* (2013.01)

(58) Field of Classification Search
None
See application file for complete search history.

(56) References Cited

U.S. PATENT DOCUMENTS

| 2007/0279369 | A1 | 12/2007 | Yao et al. | |
|---|---|---|---|---|
| 2008/0284716 | A1 | 11/2008 | Edwards et al. | |
| 2015/0069918 | A1* | 3/2015 | Trattler | H05B 45/20 315/151 |
| 2018/0263091 | A1* | 9/2018 | Daman | H05B 47/11 |

FOREIGN PATENT DOCUMENTS

| EP | 2804047 A1 | 11/2014 |
|---|---|---|
| EP | 3370226 A1 | 9/2018 |

OTHER PUBLICATIONS

European Patent Office, International Search Report for PCT/EP2019/051488 dated Mar. 29, 2019.

* cited by examiner

*Primary Examiner* — Amr A Awad
*Assistant Examiner* — Donna V Bocar
(74) *Attorney, Agent, or Firm* — MH2 Technology Law Group LLP

(57) ABSTRACT

A method for light sensing senses the light during a sub-frame of a picture frame operated display. The sensing is performed during an adaptive observation window which is determined in dependence on the duty cycle of the operation of the display. A calculation that uses the light sensed during the observation window and the light sensed during the sub-frame delivers a value indicative of the amount of received ambient light.

20 Claims, 3 Drawing Sheets

METHOD FOR SENSING AMBIENT LIGHT IN A DISPLAY

CROSS-REFERENCE TO RELATED APPLICATIONS

The present application is the national stage entry of International Patent Application No. PCT/EP2019/051488, filed on Jan. 22, 2019, which claims benefit of priority of European Patent Application No. 18154191.3 filed on Jan. 30, 2018, all of which are hereby incorporated by reference in their entirety for all purposes.

TECHNICAL FIELD

The present disclosure relates to a method for sensing light. Specifically, the present disclosure relates to a method for sensing light that comprises the receiving of light in a light sensitive element and the operating of a display. The method determines a value that indicates the amount of received ambient light.

BACKGROUND

Electronic devices often adapt the brightness of a display screen to the ambient light. A light sensor determines a signal that represents the amount of ambient light so that the brightness of the displayed information can be adjusted to the convenience of a person reading the display. Current displays, especially display screens in mobile phones or smartphones cover almost the full surface of the front side so that it is wanted that the light sensor that controls the adjustment of the screen brightness is positioned behind the screen. In this case, however, the sensor is subjected to the ambient light plus the light generated by the displaying of information.

Displays used in current smartphones illuminate the pixels by one picture frame after the other. One picture frame may include several, e.g., four sub-frames. The brightness is controlled by the duty cycle of the illumination of the pixels during the sub-frame. A low duty cycle has a short on-time and a long off-time of the pixels to generate a low brightness of the screen. A high duty cycle has a long on-time and a short off-time of the pixels to generate a high brightness.

Current sensors positioned behind the display screen in bezel-less smartphones measure the ambient light during an additionally inserted off-time of the display. Because the time available for a measurement is relatively short, the measurement process may not be stable enough and may suffer from transient effects. In addition, transient effects from the surroundings such as modulated light from light bulbs, fluorescent lights or LED lights may affect the measurement.

It is therefore a need for a more reliable measurement of ambient light in a situation where the light sensor is disposed behind the display.

SUMMARY

A method according to an embodiment of the present disclosure receives light in a light sensitive element such as a photoelectric device or a photodiode. The photodiode generates an electrical current that can be measured and is representative of the light received including ambient light and display light, depending on the instance of measurement. The measurement of the electrical current representing the amount of received light can be performed in several ways. One possibility is the use of a sigma-delta modulator that determines the current by a charge subtraction method and generates a stream of pulses of which the density per time indicates the amount of received light.

A display may operate on a frame by frame basis wherein one picture frame includes a number of, for example, four sub-frames. In a sub-frame, the information is displayed during an active period of a duty cycle, wherein the pixels of the screen are in an off-state during the inactive period of the duty cycle. Because these effects are very fast, the human eye does not recognize the on/off-modulation of the displaying of information. Thus, the brightness of the screen is controlled by the duty cycle of operating the pixels of the screen in a sub-frame of the frame system. This operation is controlled by a pulse width modulation (PWM) signal.

The method according to an embodiment of this disclosure requires two measurements. First, the sensing of the light over the whole or full sub-frame and, second, the sensing of the light during an observation window. A value that indicates the amount of ambient light received is achieved by a calculation using both measurements.

An adaptive observation window that depends on the actual duty cycle of the pulse width modulation signal of the sub-frame ensures that a reliable measurement is performed in different operational states of the duty cycle. As a result of the adaptive measurement window, the sensing process and the calculation of the ambient light is reliable without a need to influence the operation of the display such as a shut-off of the display for the small amount of time. The measurement can be performed in parallel and concurrently with the operation of the display without disturbing the operation of the display. The method allows that the sensor is disposed behind the display screen.

The observation window is dependent on the duty cycle of the displaying of information in a sub-frame. When the display screen is operated with low brightness, which means that the duty cycle of the illumination of the pixels in a sub-frame has a short active on-time and a long inactive off-time, the observation window is set to be active at least during the active phase of the duty cycle of the pulse width modulation signal. Furthermore, the observation window is slightly longer than the active phase of the duty cycle in that a margin is added. In this case of low display brightness or a low duty cycle, the observation window covers the active phase of the duty cycle and a transitional phase added thereto.

When the display screen is operated at high brightness, which means that the duty cycle has a long active on-time and a short inactive off-time, the observation window is set to be active during at least the inactive phase of the duty cycle of the pulse width modulation signal. Furthermore, a margin is added to cover also a transitional phase. As a result, the observation window to measure the light received in a sub-frame is set differently for duty cycle rates higher than a predetermined rate and for duty cycle rates lower than a predetermined rate. In practice, the observation window is set differently for a duty cycle rate being lower than 50% and higher than 50%. Other predetermined rates to choose between different observation windows are also possible.

In an embodiment, the margin added to the active phase of the duty cycle or the inactive phase of the duty cycle depending on the duty cycle rate is the transitional time during which the sensed light signal indicates a transition from a higher amount of light to a lower amount of light received or the transition from a lower amount of light to a higher amount of light received. It is useful to add both the preceding and the trailing margins to achieve the observation window. This ensures that also the transitional phases are evaluated by the sensing process. The sensing time is longer and the effects of transients are completely included in the sensing result. In addition, the margins on both sides make the system insensitive to the sensor mounting position variances in production.

In one embodiment, the sensing process may comprise a sigma-delta modulation of a sigma-delta analog-to-digital converter that generates a stream of pulses "1" of which the temporal density or the amount of pulses over a time unit represents the amount of sensed light. For example, a high pulse density indicates a high amount of light sensed, and a low pulse density indicates a low amount of light sensed. When the duty cycle in a sub-frame is at the lower rate, for example, lower than 50%, the observation window includes the time when the density of pulses is high, which is the active phase of the duty cycle of a sub-frame, and also the preceding and trailing transitional phases that include the transition from lower pulse density to higher pulse density on the one hand and higher pulse density to lower pulse density on the other hand. When the duty cycle in a sub-frame is at the higher rate, for example, higher than 50%, the observation window includes the time when the density of pulses is low, which is the inactive phase of the duty cycle of a sub-frame, and also the preceding and trailing transitional phases from higher pulse density to lower pulse density on the one hand and lower pulse density to higher pulse density on the other hand.

The number of pulses is counted during the observation window. Furthermore, the number of pulses is counted over the whole or full period of a sub-frame. By calculation, a value for the display light only and a value for the ambient light only are calculated numerically. Specifically, from the light received in the light sensitive element such as a photodiode a stream of pulses is generated that is indicative of the amount of light received. The sensing of light during the sub-frame comprises a first counting of the pulses during the sub-frame. This counting is performed during the observation window and outside the observation window. The sensing of light during the observation window comprises another, second counting of the pulses during the observation window. The obtained counting values from the first and second countings are further processed to calculate a value indicating the amount of received ambient light. The calculation may also use the value of the duty cycle of the observation window and the value of the duty cycle of the operation of the display, the latter used to achieve a desired brightness of the screen or the displaying of information. The latter duty cycle is determined by a pulse width modulation signal operating the display.

In an embodiment, a sigma-delta modulation process includes an integrating capacitor that is charged by the current received from the photodiode. The voltage on the capacitor is compared to a threshold. When the threshold value is reached or exceeded, a pulse "1" is generated and the charge stored in the capacitor is reduced by a fixed charge amount supplied from another capacitor and the integrating process proceeds. The higher the current from the photodiode, the faster these steps occur and the denser the pulses are in a time unit. The concept of a sigma-delta modulator is well known to a skilled person. The present disclosure concerning the adaptive observation window is useful in connection with a sigma-delta modulator, although the use of other integrating analog-to-digital conversion processes are also possible.

Another analog-to-digital conversion type useful for the present disclosure may comprise the charging of a capacitor by a photo current and comparing the charge or voltage on that capacitor with a reference charge or a reference voltage to generate a signal or a digital number that represents the amount of light sensed.

Turning back to the sigma-delta modulation concept, the counting of pulses during a sub-frame results in a value for all the pulses counted ALLP. This counting comprises a counting during the observation window and outside the observation window. The additional counting of pulses during the adaptive observation window results in a number of pulses OWP. The duty cycle of the observation window OW can be calculated dividing the active length of the observation window by the full period which is the sum of the active and inactive phases of the observation window signal. In the case that the duty cycle is lower than the predetermined rate of, e.g., 50%, the value representative of the amount of light received during the active phase of the display duty cycle which includes the display light plus the ambient light is:

$$DLP=(OWP-ALLP*OW)/(1-OW).$$

The value for the ambient light ALP can be calculated by $$ALP=ALLP-(OWP-ALLP*OW)/(1-OW) \text{ or}$$

$$ALP=ALLP-DLP.$$

In the case that the duty cycle is higher than the predetermined rate of, e.g., 50% the calculation requires furthermore the value DC of the duty cycle of the pulse width modulation signal operating of the display so that the value DLP can be calculated as follows:

$$DLP=(ALLP*OW*DC-OWP*DC)/(OW*DC+(1-DC)-OW),$$

Also in this case, the value for the ambient light ALP is $$ALP=ALLP-(ALLP*OW*DC-OWP*DC)/(OW*DC+(1-DC)-OW) \text{ or}$$

$$ALP=ALLP-DLP.$$

Because the observation window is active during a short amount of time which is in the range of the active phase of a lighting element such as a light bulb, a fluorescent light or an LED light, it is useful to perform the sensing and counting processes over several consecutive sub-frames. This reduces the intermodulation results of the sensor output values caused by lighting systems operating on the basis of the mains frequency. In practice, the light modulation by the mains frequency is 50 or 60 Hz. The display update rate may be also at 60 Hz for one picture frame, which may include four sub-frames inside the picture frame. It is useful to perform a sensing and counting over several picture frames and sub-frames, for example, over a length of time of six picture frames, which means 24 sub-frames in the present example. This reduces or substantially averages out the influence of the reception of 50/60 Hz-modulated light received by the sensor.

Furthermore, it is useful not to start the counting at the first sub-frame of a picture frame, because a content of the picture to be displayed or the image information to be displayed on the display screen may change from the last sub-frame of the preceding picture frame to the first sub-frame of the subsequent picture frame. In order to avoid transitional effects from the updating of the to be displayed information, it is useful to start the sensing and counting processes at least at the second or at the third or at the fourth sub-frame of a picture frame. When the sensing is made over 24 sub-frames, the total measurement period will end at the second, third or fourth sub-frame of the last, e.g. sixth, picture frame.

It is to be understood that both the foregoing general description and the following detailed description are merely exemplary, and are intended to provide an overview or framework to understand the nature and character of the claims. The accompanying drawings are included to provide a further understanding and are incorporated in, and constitute a part of, this description. The drawings illustrate one or more embodiments, and together with the description serve to explain principles and operation of the various embodiments. The same elements in different figures of the drawings are denoted by the same reference signs.

DETAILED DESCRIPTION

The present disclosure will now be described more fully herein after with reference to the accompanying drawings showing embodiments of the disclosure. The disclosure may, however, be embodied in many different forms and should not be construed as limited to the embodiments set forth herein. Rather, these embodiments are provided so that the disclosure will fully convey the scope of the disclosure to those skilled in the art. The drawings are not necessarily drawn to scale but are configured to clearly illustrate the disclosure.

In an embodiment, a light sensor is disposed behind or underneath a display screen of a smartphone. The light sensor serves to sense the level of incident light during several stages of operation and calculate the ambient light therefrom so that the brightness of the display screen of the smartphone can be controlled to provide a convenient appearance and readability to a user. The light sensor includes circuitry to determine the amount of light incident on a photoelectric element within the sensor such as a photodiode. In the present embodiment, the sensor includes a sigma-delta modulator coupled to the photodiode to sense the incident light.

The electrical current generated by the incident light repetitively charges a capacitor. In other words, the current from the photodiode is integrated by a capacitor. The capacitor voltage is compared to a threshold level. If the charge/voltage exceeds the threshold level, a pulse is generated and the charge of the capacitor is reduced by a predetermined reference charge. The capacitor is continuously charged by the diode current and the above described process is repeated again. If there is bright light so that the diode current is high, the charging of the integrating capacitor is fast and the number of pulses generated by the sigma-delta modulator in a time unit is high. If the light intensity and the diode current are low, the density of generated pulses in a time unit is low. Other principles to measure the diode current in an integrative way, different from the above described sigma-delta modulator concept may also be possible.

Figure 1:
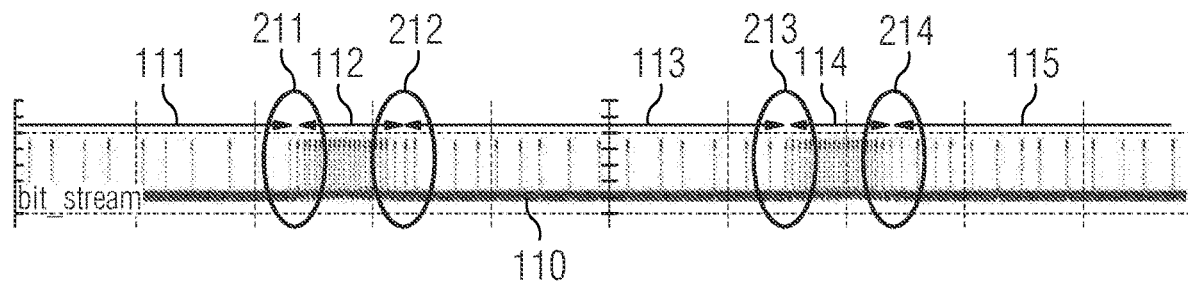
FIG. 1 shows a sample portion of a pulse sequence received from a sigma-delta modulator.

FIG. 1 shows an exemplary bit-stream generated by the above described sigma-delta modulation process. The bit-stream 110 comprises a section 111 of low density pulses, which indicates that the light incident on the sensor has low intensity. Section 112 includes a high density of pulses, which indicates that a high amount of light or light with high brightness is incident on the sensor. The bit-stream continues with a section 113 of a low density bit-stream followed by a section 114 of a high density bit-stream again followed by a section 115 of a low density bit-stream. The bit-stream includes transitional portions 211, 212, 213, 214 between sections of high and low pulse densities that result from transitional effects in components and processes employed and result from the ratio of the sensor window to the width of a single display line.

The alternating sections of higher and lower pulse densities such as 111, 112 etc. are a result of the operation of the display screen in the described embodiment of a smartphone. The display is operated frame by frame, wherein one picture frame is sub-divided in, for example, four sub-frames. The to be displayed picture information is updated from picture frame to picture frame. The picture information within a frame is displayed four times by the sub-frames to enhance picture quality. Within a sub-frame, the pixels on the screen are illuminated for a portion of the sub-frame and are shut off and dark for the rest of the sub-frame. The relation between active and inactive portions of a sub-frame is perceived as the brightness of the screen. If the active portion is short and the inactive portion is long, the picture information displayed on the screen appears relatively dark. If the active portion is long and the inactive portion is short, the displayed picture information is bright. The brightness of the screen is established by the relation between active and inactive portions of the illumination of the screen within a sub-frame of the frame-wise operation of the screen. This operation is controlled by a pulse width modulation (PWM) control signal defined by the processor of the smartphone. The pulse width rate or the duty cycle of the pulse width modulation signal is the rate between active and inactive portions of the illumination of the screen during a sub-frame, which controls the brightness of the display.

During an active phase of the duty cycle the lines of the display are illuminated in consecutive order so that the sensor disposed behind the display receives the light from the adjacent lines in an active phase such as 112, 114 in addition to the ambient light. During the inactive phase, such as 111, 113, 115, the light incident on the sensor originates from the surroundings of the smartphone when only ambient light is incident on the sensor. The ambient light may be natural light, sunlight or artificial light from light bulbs, fluorescent lamps or LED lamps.

In order to adjust the brightness of the display of the smartphone in response to the amount of ambient light in order to achieve a convenient appearance to the user, the sensor must determine the amount of ambient light. For example, the low density pulse section 113 is a bit-stream representative of ambient light sensed by the sensor, whereas the high density pulse portion 112 includes ambient light plus display light sensed by the sensor. According to the herein described embodiment, a window is generated in response to the duty cycle of the PWM display operation to sense either a high density portion or a low density portion of the bit-stream generated by the sigma-delta modulator and perform a calculation in order to calculate the display light portion and the ambient light portion included in the bit-stream. This process will be described in more detail herein below.

Figure 2:
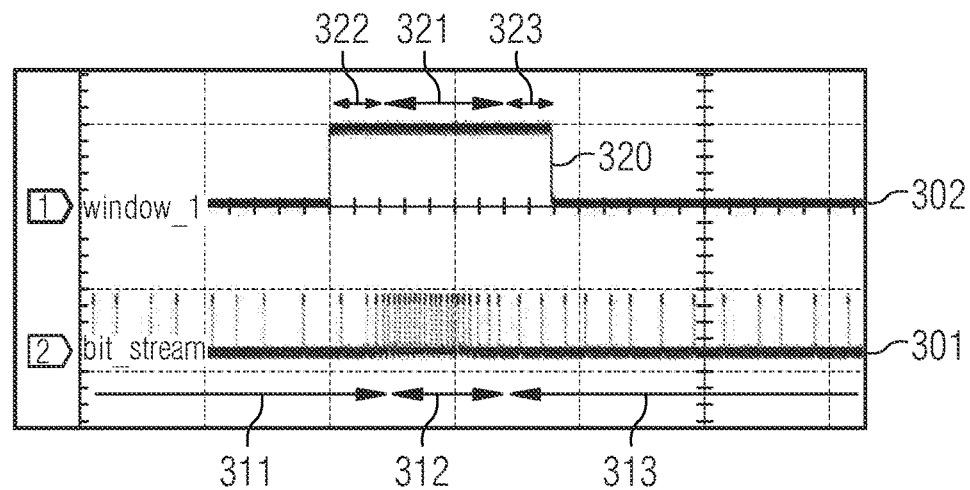
FIG. 2 shows a pulse sequence and an adaptive observation window for a high duty cycle.

FIG. 2 shows relevant signals that are used in the process according to the present embodiment. FIG. 2 shows a bit-stream 301 that has a high density pulse section 312 and preceding and trailing low density pulse sections 311, 313. The duty cycle of the display screen is represented in bit-stream 301 by the relation of the high density portion 312 relative to the full period of a display cycle within a sub-frame. It is to be noted that FIG. 2 does not completely show a full display cycle as only one representative high density portion 312 is depicted that is periodically repeated. Section 312 is caused by display generated light plus ambient light, and sections 311, 313 are caused by ambient light only.

Figure 3:
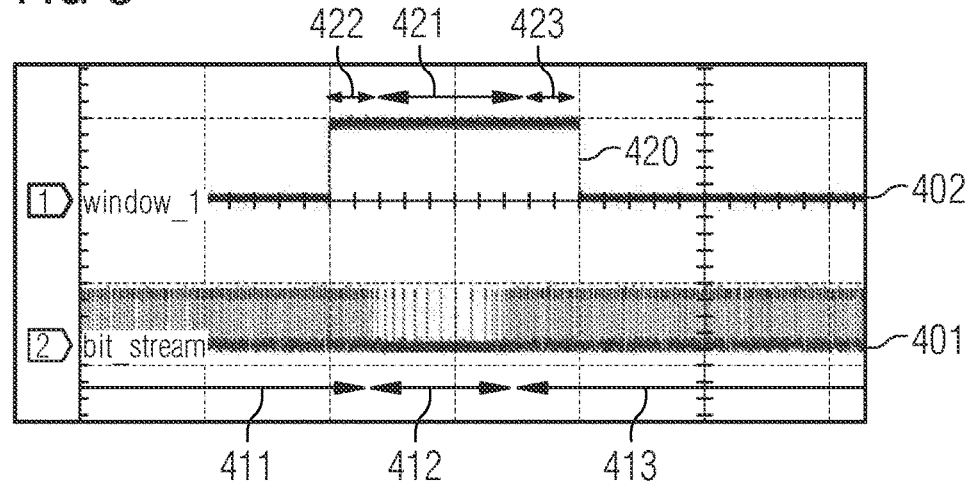
FIG. 3 shows a pulse sequence and an adaptive observation window for a low duty cycle.

FIG. 3 shows another light sensing situation in which only a small portion 412 of the bit-stream has low density that is ambient light only. The preceding and trailing portions 411, 413 are high density portions that include ambient light plus display generated light. As becomes apparent from a comparison of FIGS. 2 and 3, the duty cycles of the display operation represented as the relation between high density pulse portions 312 and 411, 413 relative to a full repetition period are different in that the duty cycle of the PWM display operation in FIG. 2 is lower than that of FIG. 3. These duty cycles result from the pulse width modulation (PWM) signal that controls the operation of the display in a sub-frame.

According to the present disclosure, an observation window signal 302 is generated to evaluate the counts of the pulses. During an active phase 320 of the observation window signal 302 the pulses of the bit-stream signal 301 are counted. All pulses of bit-stream 301 that occur during the active observation window phase 320 are counted by a counter. The observation window 320 is controlled by the pulse width signal that controls the duty cycle of the display operation. In the case depicted in FIG. 2 of a low duty cycle of less than 50%, the observation window 320 covers the high density pulse section 312 of the bit-stream. In the case depicted in FIG. 3 of a high duty cycle of higher than 50%, the observation window 420 covers the low density pulse section 412. The pulses of bit-stream 301 and 401 that occur during the presence of the active portion of observation window 320 and 420, resp., are counted in a counter. Furthermore, all the pulses are counted within and outside the observation window by another counter. This process may require at least two counters for the counting operation during the observation window and for the counting within and outside the observation window.

According to an aspect of the present disclosure, the process is adaptive in that it uses a different observation window 320, 420 in dependence on the current value of the duty cycle of the PWM display operation. For a low duty cycle as depicted in FIG. 2 of less than 50%, the observation window 320 includes the active portion of the duty cycle and consequently the relatively short high density pulse section 312 of the bit-stream 301. In the complementary case, when the duty cycle is higher than 50%, the observation window 420 includes the inactive portion of the duty cycle of the display operation and includes the low density portion 412 of bit-stream 401. This means that the observation window and the counting of corresponding pulses of the bit-stream is adaptive in that it is dependent from the value of the duty cycle of the display operation.

According to an aspect of the present disclosure, the adaptive observation window includes also margins 322, 323, 422, 423 that are added to the pulse width signal sections 321, 421. The margins include the transitional phases from low density to high density sections of the bit-stream such as 322, 423 and the transitions from high density to low density sections of the bit-stream such as 323, 422. The transitional sections are soft transitions where the sigma-delta conversion process generates a gradual increase or decrease of the density of pulses from one density state to the other density state. The inclusion of the margins in the adaptive observation windows ensures that the observation windows cover a large enough period of time to collect a sufficient number of bit-stream pulses including the complete amount of pulses generated by the display or the complete phase of low pulse density with no pulses generated by the display. In an embodiment, the margin is a fixed value that is large enough to ensure that the full transitional phase is covered by the observation window. For example, the margin may be 25% of a period, which is split up into 12.5% on either side of the length of the pulse width signal section. If, for example, the active portion of the pulse width signal is 5%, the observation window including margins results to 30%. If the active portion of the pulse width signal is close to parity such as 40%, the observation window results to 65%. The proper setting of the margin may be determined by simulation or experimentation. The size of the margin may depend from the bandwidth of the sigma-delta conversion process, the ratio of the sensor window to the width of a single display line and other parameters. Furthermore, the margin size can be configured in such a way that variances in the position of the sensor during production are eliminated.

Figure 4:
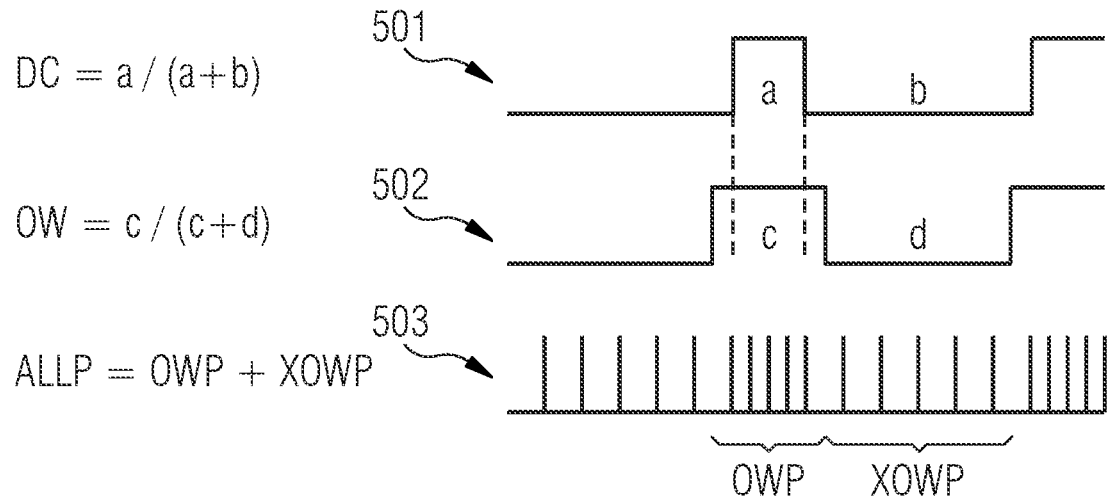
FIG. 4 shows count and calculation values for a low duty cycle situation.
Figure 5:
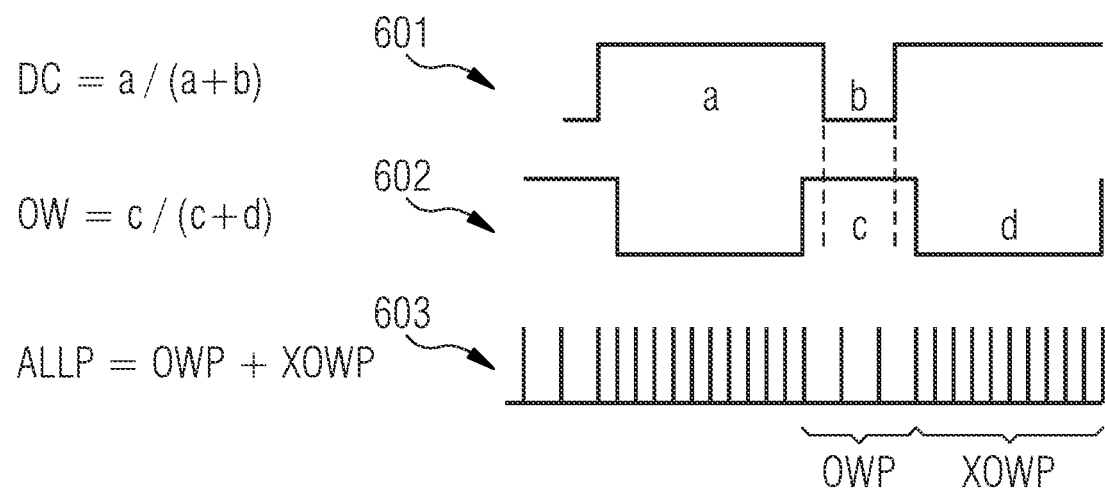
FIG. 5 shows count and calculation values for a high duty cycle situation.

In connection with FIGS. 4 and 5, calculations to be performed from the countings described in connection with FIGS. 2 and 3 are described. FIG. 4 depicts the situation when the display duty cycle is low, and FIG. 5 depicts the situation when the display duty cycle is high. A low duty cycle means a duty of less than a predetermined value, such as less than 50%, a high duty cycle means a value greater than the predetermined value, such as higher than 50%. FIGS. 4 and 5 depict count values and calculations to obtain the display light portion and the ambient light portion.

Turning now to FIG. 4, curve 501 depicts the display pulse width modulation (PWM) signal having a duty cycle of less than 50%. The active phase a of the pulse width signal is short compared to the inactive phase b, which is rather long. The duty cycle of the pulse width modulation signal 501 is DC=a/(a+b). Signal 502 is the observation window signal which has an active phase c that covers the active phase a of the pulse width signal 501 plus margins added to the left and to the right. The inactive phase of the observation window signal is phase d. The pulse width of the observation window signal is OW=c/(c+d). Graph 503 shows the pulses from the sigma-delta modulation in abstract form. All pulses over one period ALLP is the sum of the pulses OWP and XOWP counted during the active phase c and the inactive phase d, resp., of the observation window signal, i.e. ALLP=OWP+XOWP that is the number of pulses during the observation window and outside the observation window.

Turning now to FIG. 5, the situation with a pulse width duty cycle of greater than 50% is depicted. The pulse width signal 601 has a large active phase and a short inactive phase b. The active window c of the observation window signal 602 comprises the inactive phase b of the pulse width modulation signal 601 plus margins added to the left and to the right. The calculations for the duty cycle of the pulse width modulation signal DC (wherein DCL=1−DC), the observation window duty cycle OW and the bit-stream pulses ALLP are the same as in the situation described in connection with FIG. 4. The calculation performed for both cases of a pulse width modulation duty cycle of less than 50% and of higher than 50% are as follows:

1. PWM DC<50% (FIG. 4):

$$ALLP=ALP+DLP \quad (1)$$

$$OWP=ALP*OW+DLP \quad (2)$$

$$\text{from (1): } ALP=ALLP-DLP \quad (3)$$

$$\text{(3) in (2): } OWP=ALLP*OW-DLP*OW+DLP \quad (4)$$

$$\text{from (4): } DLP=(OWP-ALLP*OW)/(1-OW) \quad (5)$$

$$\text{from (3): } ALP=ALLP-K1*DLP \quad (6)$$

2. PWM DC>50% (FIG. 5):

$$ALLP=ALP+DLP \quad (7)$$

$$OWP=ALP*OW+DLP*(OW-DCL)/DC \quad (8)$$

$$\text{from (7): } ALP=ALLP-DLP \quad (9)$$

$$\text{(9) in (8): } OWP=ALLP*OW-DLP*OW+DLP*(OW-DCL)/DC \quad (10)$$

$$\text{from (10): } DLP=(ALLP*OW*DC-OWP*DC)/(OW*DC+DCL-OW) \quad (11)$$

$$\text{from (3): } ALP=ALLP-K2*DLP \quad (12)$$

In the above calculation, ALP are the bitstream pulses representative of ambient light and DLP are the bitstream pulses representative of display light. It is to be noted that the formulas include corresponding correction factors K1 and K2. In practice, K1 and K2 may be omitted, i.e. K1=K2=1. However, depending on the specific situation in a smartphone and depending on the components used, it may be useful to use a correction factor that takes into account the reflections that originate from lines close to the sensor, when the sensor is behind the display screen. The reflections originate from neighboring lines and may be reflected at elements of the screen such as the screen glass and input into the photodiode. The correction factors may be used to remove this parasitic effect from the calculation. In any case, the correction factors K1, K2 are relatively close to 1 or 100%.

While the present measurement process has been described in connection with bit-streams generated by sigma-delta modulation converters, it is conceivable that also other light sensing methods are used. Practically, any integrating analog-to-digital converter can be used. For example, the converter may work on the basis of charging and discharging capacitors and may evaluate the analog values rather than bit-streams.

Figure 6:
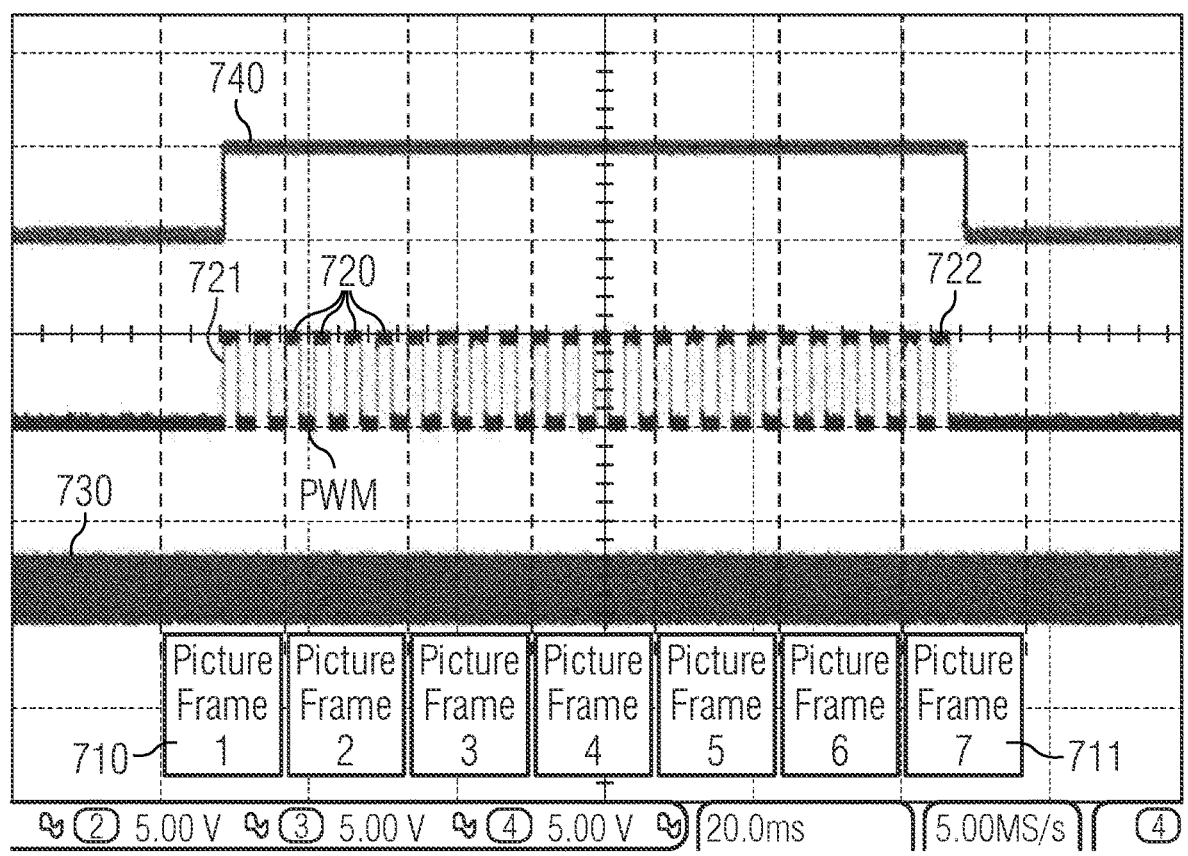
FIG. 6 shows a signal diagram spreading several picture frames.

FIG. 6 shows a chart of several relevant signals occurring in a method according to the present disclosure at a higher system level. Shown are seven consecutive picture frames of which the first one and the last one are labeled as 710, 711. One picture frame comprises four sub-frames 720. One sub-frame is controlled by a pulse-width modulation signal PWM that has a duty cycle of DC (FIGS. 4 and 5). In current smartphones, the to be displayed picture information is updated with the first sub-frame in a picture frame. The picture information is repeated four times within the four consecutive sub-frames 720.

The display update cycle of modern smartphones is a 60 Hz picture frame repetition rate, wherein the picture frame is updated every 16.7 ms (milliseconds). Four PWM sub-frames are within one picture frame. In order to achieve an integration time of at least 50 ms to reduce the influence of 50 or 60 Hz light modulation, the measurement is to be continued over 12 sub-frames. According to an embodiment, the integration time may be at least 100 ms and the measurement is continued over 24 sub-frames. The extension of the counting over 12 or 24 frames ensures that artificial light that may be modulated by 50 Hz or 60 Hz from a light bulb, a fluorescent lamp or an LED lamp is substantially reduced or even practically eliminated by averaging in the OWP, XOWP counts.

Signal 730 represents the bit-stream from the sigma-delta conversion wherein the pulses are so dense that they are not individually visible at this level of representation. A measurement window 740 of 24 sub-frames is enabled to select consecutive sub-frames with a duration of 6 picture frames. As apparent from FIG. 6, the selection window 740 selects the third sub-frame 721 from the first picture frame 710. Consequently, the measurement window ends at the second picture frame 722 of the last picture frame 711. The counting of the pulses OWP, XOWP (FIGS. 4 and 5) is performed additively over the 24 sub-frames selected by measurement window 740. The counting proceeds continuously for OWP and XOWP for the 24 sub-frames. If a counting over only 12 sub-frames (not shown in the drawings) is desired, the measurement window is configured such that a duration of 3 picture frames is selected.

In order to avoid the influence of a change of the display content information which is made in the first frame of a new picture frame, the measurement should not start with the first frame of a new picture frame. Instead the measurement over the 24 consecutive sub-frames should start with the second, third or fourth sub-frame of a picture frame and, correspondingly, the measurement ends with the first, second or third sub-frame of the last selected picture frame. That is why selection window 740 selects the third sub-frame 721 of the first picture frame 710 in FIG. 6 as the first sub-frame at which the measurement and the counting of the OWP and XOWP values over 24 sub-frames starts. In this example, the measurement window stretches over 24 sub-frames with a duration of 6 picture frames. The 24 sub-frames are taken from 7 consecutive picture frames, as the first and last picture frames contribute only a subset of their sub-frames. In general, the measurement should be a multiple of 50 ms or 100 ms and longer than 100 ms.

The method according to an embodiment of the present disclosure makes a measurement with an adaptive observation or measurement window. As a result, the ambient light sensing can be performed over a wide range of pulse width modulation (PWM) duty cycles with which the display of information in a sub-frame of a frame-operated display screen is controlled. The adaptive measurement window can be extended with margins covering the soft transitions from high pulse density to low pulse density and low pulse density to high pulse density of a sigma-delta modulated pulse stream. The margins make the solution also insensitive to sensor position variances in production. The overlap margin of OW over DC (see FIGS. 4 and 5) includes also the sensor position variation in production. The measurement has a high precision and covers a wide range of PWM duty cycle values. In practice, the measurement achieves a better accuracy than previous measurement solutions, where measurement may take place only in an off-phase of the display.

It will be apparent to those skilled in the art that various modifications and variations can be made without departing from the spirit or scope of the disclosure as laid down in the appended claims. Since modifications, combinations, sub-combinations and variations of the disclosed embodiments incorporating the spirit and substance of the disclosure may occur to the persons skilled in the art, the disclosure should be construed to include everything within the scope of the appended claims.

The invention claimed is:

1. A method for sensing light, comprising:
   receiving light in a light sensitive element and generating a signal indicative of an amount of light received by generating a stream of pulses of which a temporal density of the pulses is indicative of the amount of light received;
   operating a display with at least one sub-frame having a duty cycle to display information with a brightness dependent on the duty cycle, wherein the duty cycle includes a first portion in which the display is operated to emit light and a second portion in which the display is operated not to emit light;
   counting of the pulses generated during the at least one sub-frame;
   another counting of the pulses generated during an observation window, wherein the observation window is determined in dependence on the duty cycle such that when the duty cycle has a first rate lower than a predetermined rate, the observation window is determined to be active during the first portion of the duty cycle, and when the duty cycle has a second rate higher than the predetermined rate, the observation window is determined to be active during the second portion of the duty cycle; and
   calculating a value indicating an amount of received ambient light from the counting of the pulses and the other counting of the pulses.

2. The method according to claim 1, wherein,
   when the duty cycle has the first rate, the observation window is determined to be active during the first portion of the duty cycle and at least one margin, and
   when the duty cycle has the second rate, the observation window is determined to be active during the second portion of the duty cycle and at least one margin.

3. The method according to claim 2, wherein the at least one margin includes at least one of the transitional time during which the signal indicates a transition from a higher amount of light to a lower amount of light received and another transitional time during which the signal indicates the transition from a lower amount of light to a higher amount of light received.

4. The method according to claim 2,
   wherein, when the duty cycle has the first rate, the observation window is determined to include a first margin including the transitional time from a lower density of pulses to a higher density of pulses and a second margin including the transitional time from a higher density of pulses to a lower density of pulses,
   when the duty cycle has the second rate, the observation window is determined to include a third margin including the transitional time from a higher density of pulses to a lower density of pulses and a fourth margin including the transitional time from a lower density of pulses to a higher density of pulses.

5. The method according to claim 4, wherein generating a signal indicative of the amount of light received comprises generating a current in a photosensitive element and generating the stream of pulses by a sigma-delta modulation process.

6. The method according to claim 5, wherein generating the stream of pulses by a sigma-delta modulation process comprises:
   integrating the current in a capacitive element;
   generating a pulse, when the charge stored in the capacitive element exceeds a threshold;
   then subtracting a predetermined amount of charge from the charge stored in the capacitive element and continuing to integrate the current in the capacitive element.

7. The method according to claim 5, wherein, when the duty cycle of the operating of the display in response to a pulse width modulation signal is lower than the predetermined rate, a step of calculating a value DLP indicating the amount of received light from the displaying of information comprises:
   counting the pulses during the observation window as OWP;
   counting the pulses during the sub-frame as ALLP;
   calculating $$DLP=(OWP-ALLP*OW)/(1-OW),$$

wherein OW represents the duty cycle of the observation window.

8. The method according to claim 7, wherein a step of calculating a value ALP indicating the amount of received ambient light comprises calculating:

$$ALP=ALLP-(OWP-ALLP*OW)/(1-OW) \text{ or}$$

$$ALP=ALLP-DLP.$$

9. The method according to claim 5 wherein, when the duty cycle of the operating of the display in response to a pulse width modulation signal is higher than the predetermined rate, a step of calculating a value DLP indicating the amount of received light from the displaying of information comprises:
   counting the pulses during the observation window as OWP;
   counting the pulses during the sub-frame as ALLP;
   calculating $$DLP=(ALLP*OW*DC-OWP*DC)/(OW*DC+(1-DC)-OW),$$

wherein OW represents the duty cycle of the observation window and DC represents the duty cycle of the operating of the display.

10. The method according to claim 9, wherein a step of calculating a value ALP indicating the amount of received ambient light comprises calculating:

$$ALP=ALLP-(ALLP*OW*DC-OWP*DC)/(OW*DC+(1-DC)-OW) \text{ or}$$

$$ALP=ALLP-DLP.$$

11. The method according claim 5, comprising counting the pulses during a multitude of sub-frames and counting the pulses during a multitude of observation windows occurring within the multitude of sub-frames to reduce ambient light modulation caused by the mains frequency.

12. The method according to claim 11, wherein operating a display comprises displaying information within multiple picture frames, each frame including two or more sub-frames, wherein the counting of the pulses during a multitude of sub-frames starts with the second or a later occurring sub-frame of the first one of the multiple picture frames, and wherein the counting of the pulses during a multitude of observation windows ends with the first or a later occurring sub-frame of the last one of the multiple picture frames.

13. The method according to claim 2, wherein the predetermined rate of the duty cycle is 50%.

14. The method according to claim 1, comprising sensing the light during a multitude of sub-frames and sensing the light during a multitude of observation windows occurring within the multitude of sub-frames to reduce ambient light modulation caused by the mains frequency.

15. The method according to claim 1, comprising:
receiving light in a photoelectric element and performing a sigma delta modulation on the current generated by the photoelectric element to generate a stream of pulses indicative of the amount of light received;
counting the pulses during at least one sub-frame when the duty cycle of operating the display during the at least one sub-frame is lower than 50%, then:
counting the pulses during an observation window that includes an active portion of the duty cycle and a margin portion before and after the active portion;
when the duty cycle of operating the display during the at least one sub-frame is higher than 50%, then:
counting the pulses during an observation window that includes an inactive portion of the duty cycle and a margin portion before and after the inactive portion;
continuing counting during a sub-frame and counting during a measurement window for several subsequent sub-frames, thereby adding the respective counts for the several subsequent sub-frames;
performing a calculation using the counts from the sub-frames and the counts from the observations windows and the values for the duty cycle of the sub-frames and the duty cycle of the observation windows to achieve a value for the light received from the displaying of information and/or the ambient light received;
adjusting the duty cycle of further occurring sub-frames to achieve an adjusted brightness of the displaying of information that is adjusted to the calculated ambient light.

16. A method for sensing light, comprising receiving light in a light sensitive element and generating a signal indicative of an amount of light received by generating a stream of pulses of which a temporal density of the pulses is indicative of the amount of light received;
operating a display with at least one sub-frame having a duty cycle to display information with a brightness dependent on the duty cycle, wherein the duty cycle includes a first portion in which the display is operated to emit light and a second portion in which the display is operated not to emit light;
sensing the light during the at least one sub-frame by counting of pulses generated during the at least one sub-frame;
sensing the light during an observation window by another counting of the pulses generated during the observation window, wherein the observation window is determined in dependence on the duty cycle such that, when the duty cycle has a first rate lower than a predetermined rate, the observation window is determined to be active during the first portion of the duty cycle, and when the duty cycle has a second rate higher than the predetermined rate, the observation window is determined to be active during the second portion of the duty cycle; and
calculating a value indicating the amount of received ambient light from the counting of the pulses and the other counting of the pulses.

17. The method according to claim 16, wherein,
when the duty cycle has the first rate, the observation window is determined to be active during the first portion of the duty cycle and at least one margin, and
when the duty cycle has the second rate, the observation window is determined to be active during the second portion of the duty cycle and at least one margin.

18. The method according to claim 17, wherein the at least one margin includes at least one of the transitional time during which the signal indicates a transition from a higher amount of light to a lower amount of light received and another transitional time during which the signal indicates the transition from a lower amount of light to a higher amount of light received.

19. The method according to claim 18,
wherein, when the duty cycle has the first rate, the observation window is determined to include a first margin including the transitional time from a lower density of pulses to a higher density of pulses and a second margin including the transitional time from a higher density of pulses to a lower density of pulses,
when the duty cycle has the second rate, the observation window is determined to include a third margin including the transitional time from a higher density of pulses to a lower density of pulses and a fourth margin including the transitional time from a lower density of pulses to a higher density of pulses.

20. The method according to claim 16, wherein, when the duty cycle of the operating of the display is lower than the predetermined rate, a step of calculating a value DLP indicating the amount of received light from the displaying of information comprises:
counting the pulses during the observation window as OWP;
counting the pulses during the sub-frame as ALLP;
calculating $$DLP=(OWP-ALLP*OW)/(1-OW),$$

wherein OW represents the duty cycle of the observation window,
wherein a step of calculating a value ALP indicating the amount of received ambient light comprises calculating:

$$ALP=ALLP-(OWP-ALLP*OW)/(1-OW) \text{ or}$$
$$ALP=ALLP-DLP,$$

wherein, when the duty cycle of the operating of the display is higher than the predetermined rate, a step of calculating a value DLP indicating the amount of received light from the displaying of information comprises:
counting the pulses during the observation window as OWP;
counting the pulses during the sub-frame as ALLP;
calculating $$DLP=(ALLP*OW*DC-OWP*DC)/(OW*DC+(1-DC)-OW),$$

wherein OW represents the duty cycle of the observation window and DC represents the duty cycle of the operating of the display, wherein a step of calculating a value ALP indicating the amount of received ambient light comprises calculating:

$$ALP=ALLP-(ALLP*OW*DC-OWP*DC)/(OW*DC+(1-DC)-OW) \text{ or}$$

$$ALP=ALLP-DLP.$$

* * * * *